March 18, 1958 G. LEFEVRE 2,827,038
BORING MACHINE ADAPTED MORE PARTICULARLY FOR THE USE IN THE
BORING OF SMALL HARD STONES SERVING FOR INDUSTRIAL PURPOSES
SUCH AS CLOCKWORK JEWELS OR DRAW-PLATES
Filed Nov. 1, 1956 9 Sheets-Sheet 1
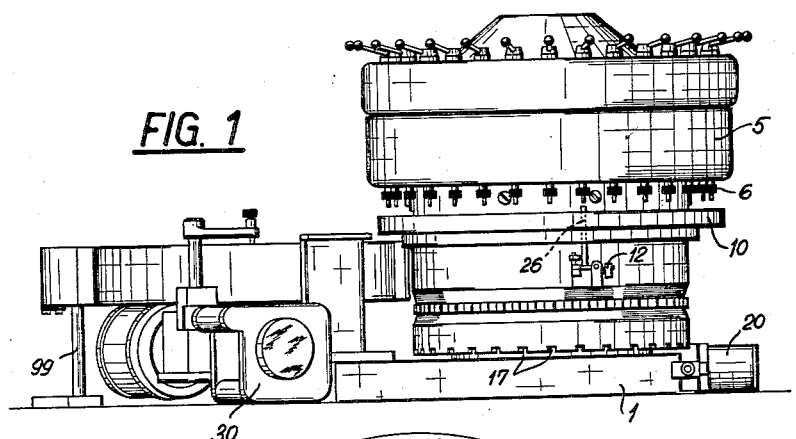
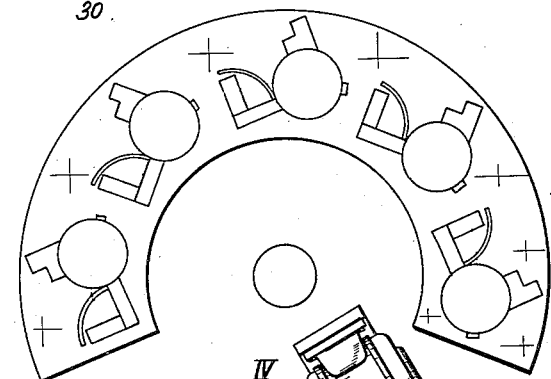
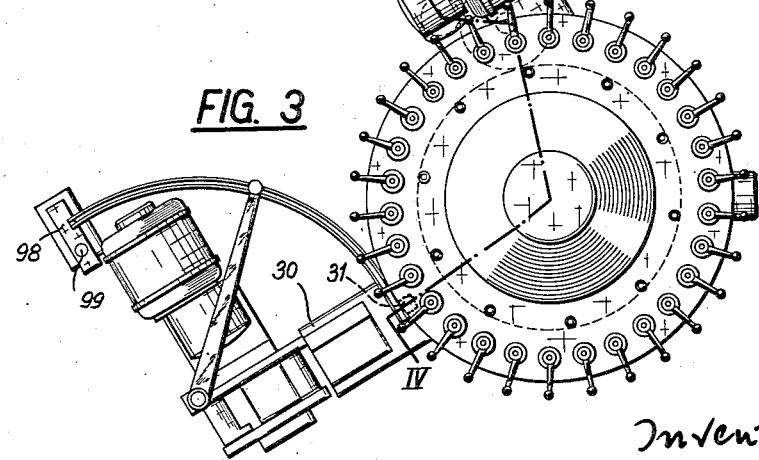
Inventor:
Gabriel Lefevre
by Melatter-Seguy
Attorney

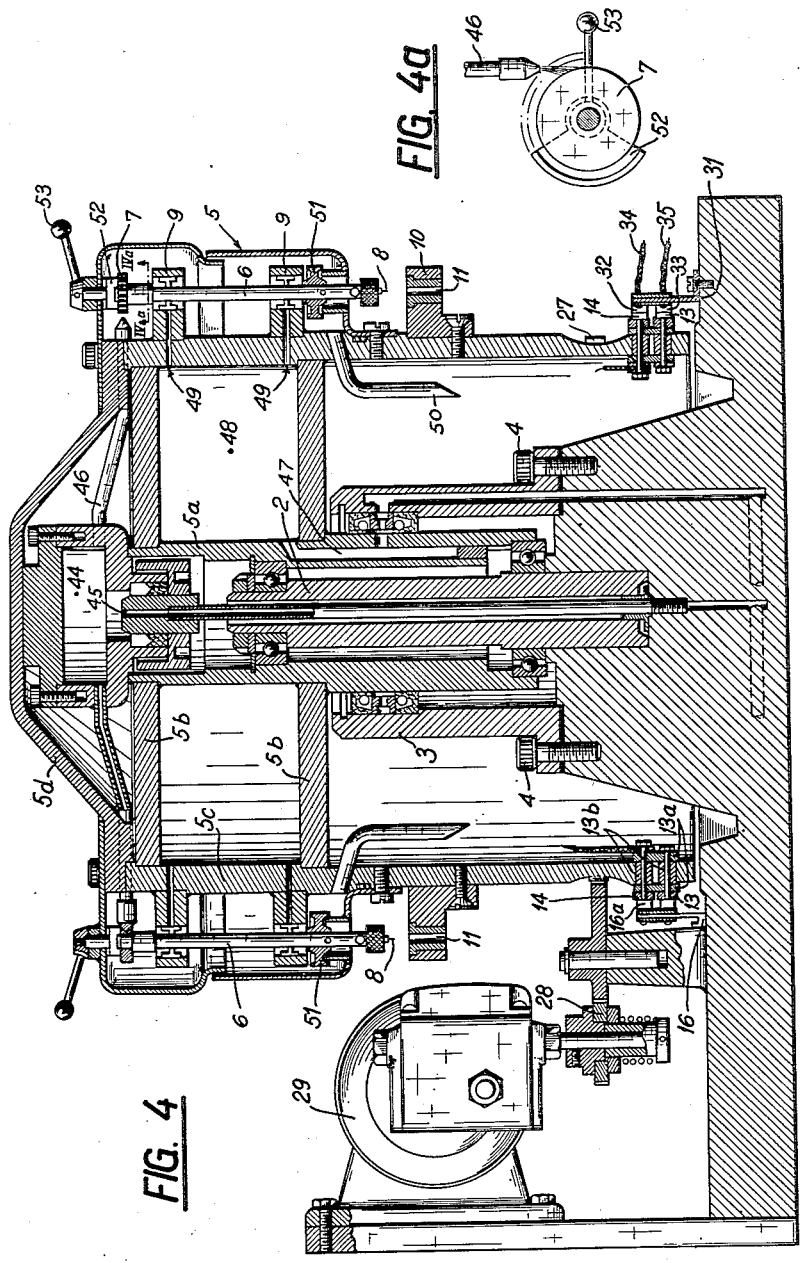

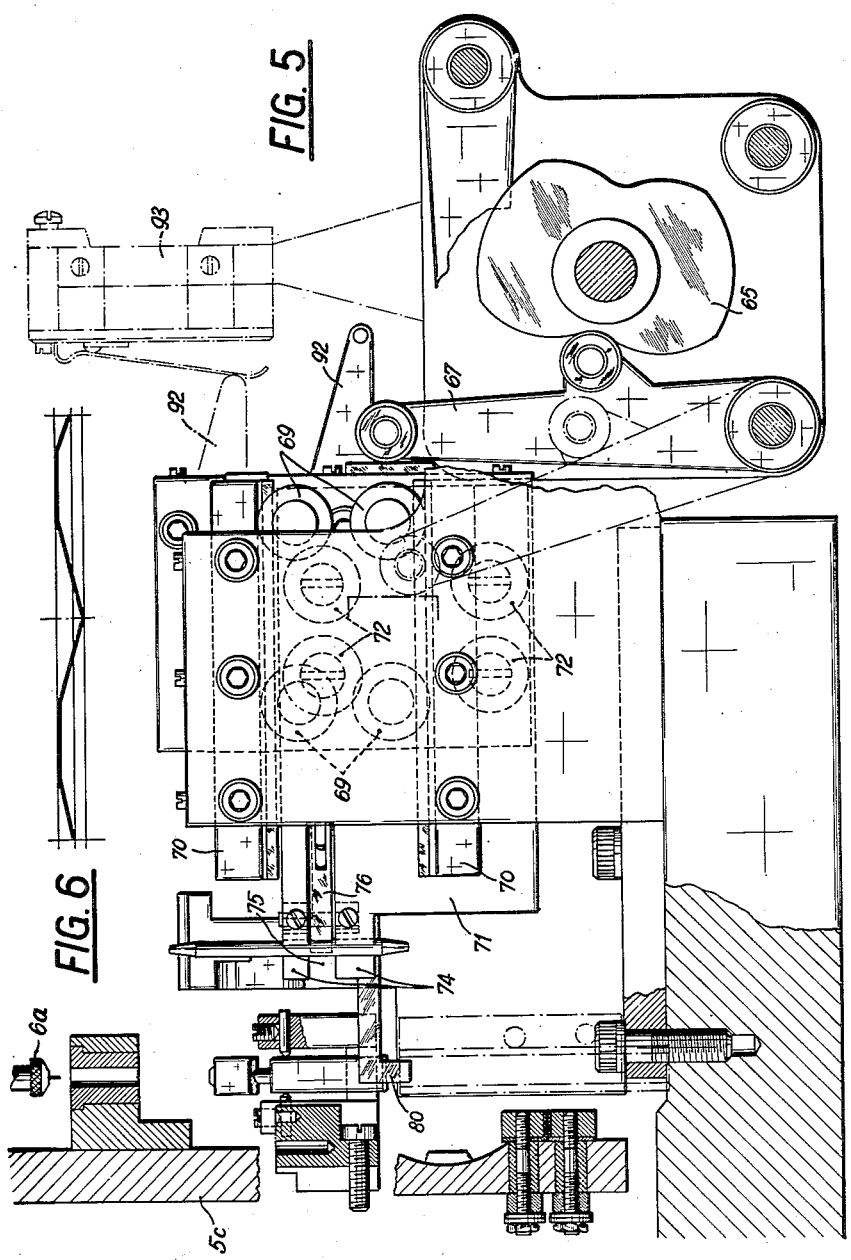

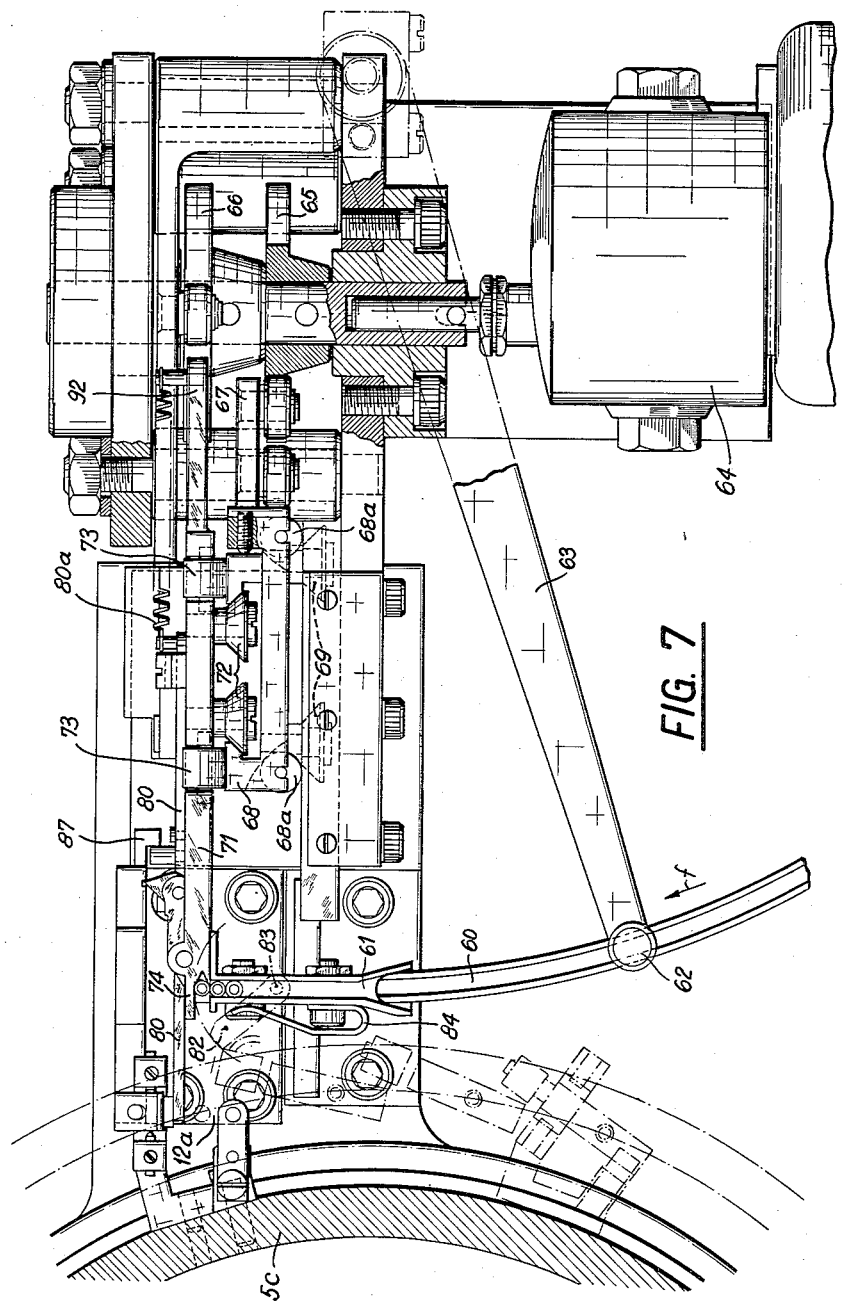

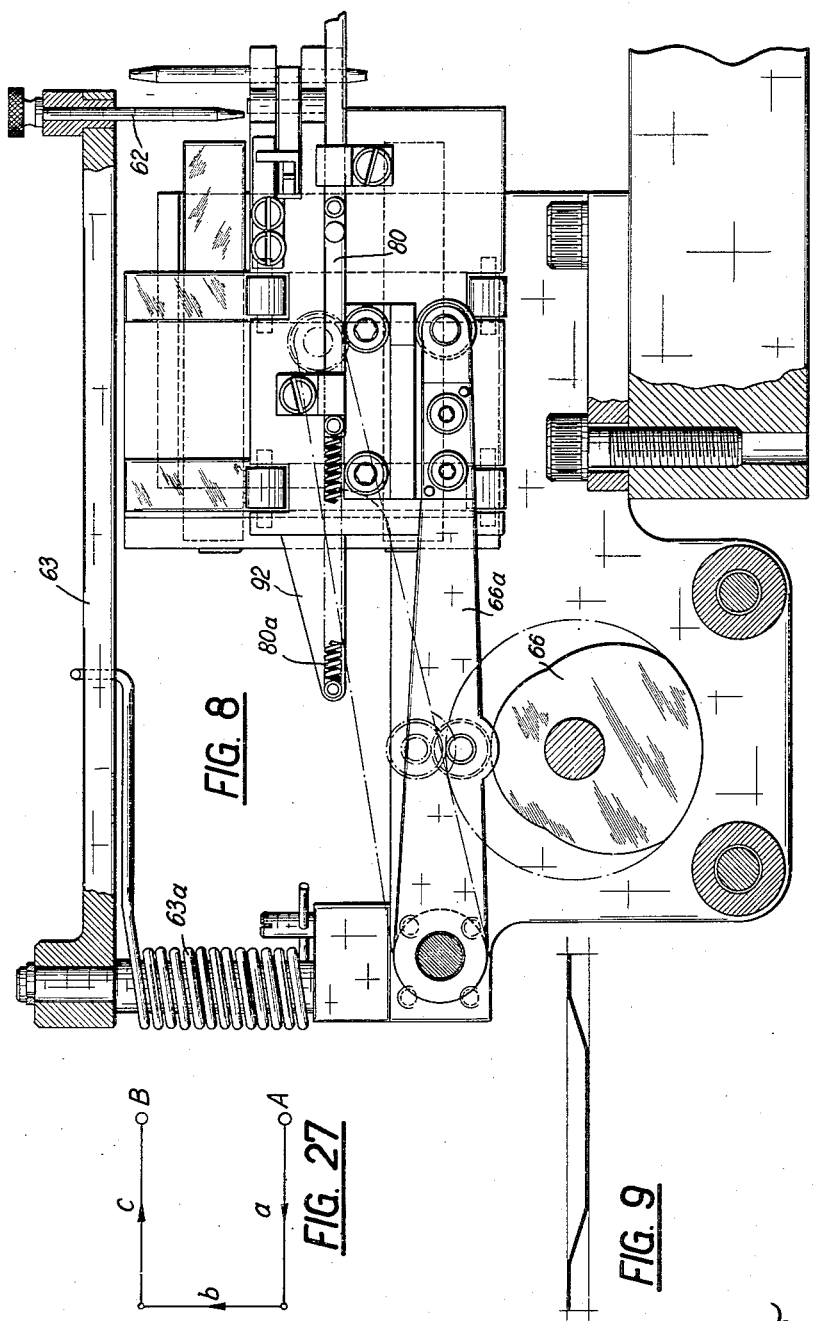

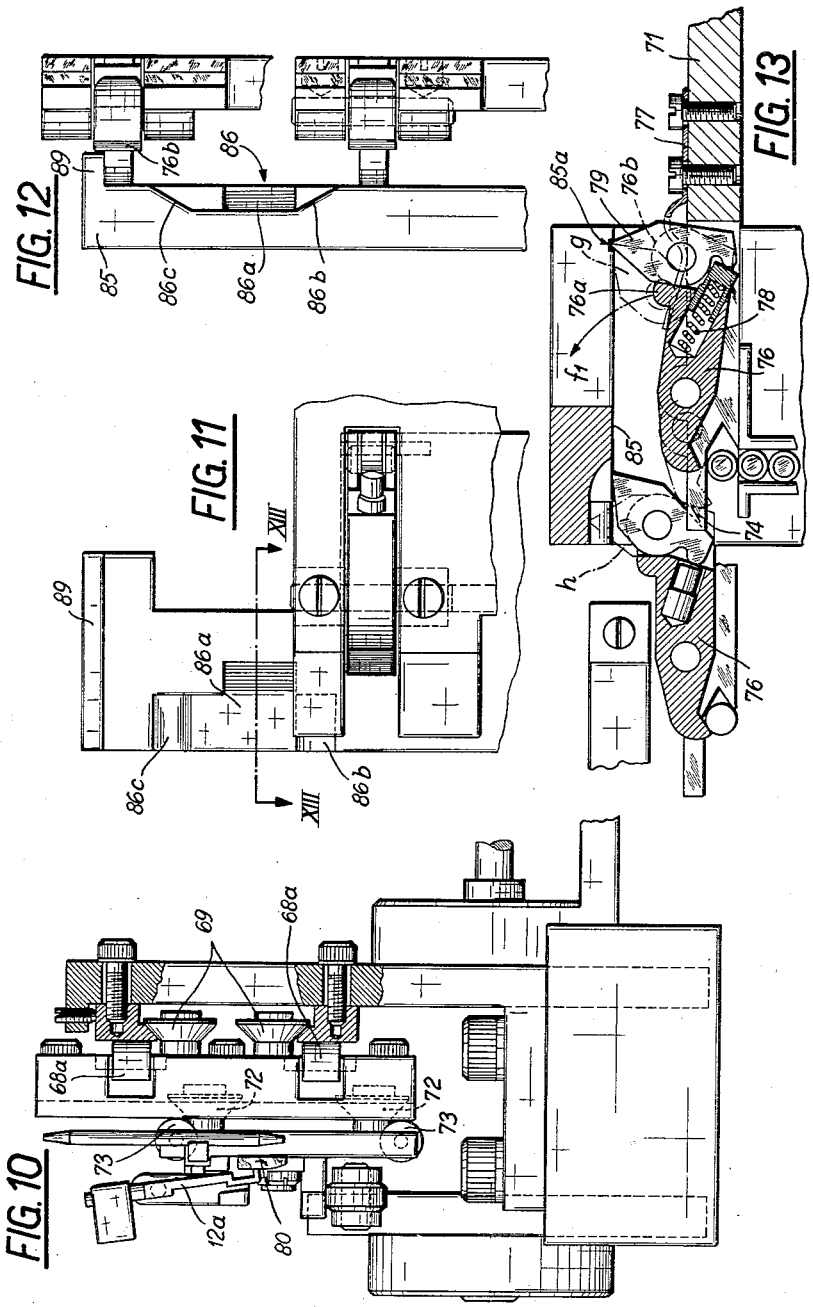

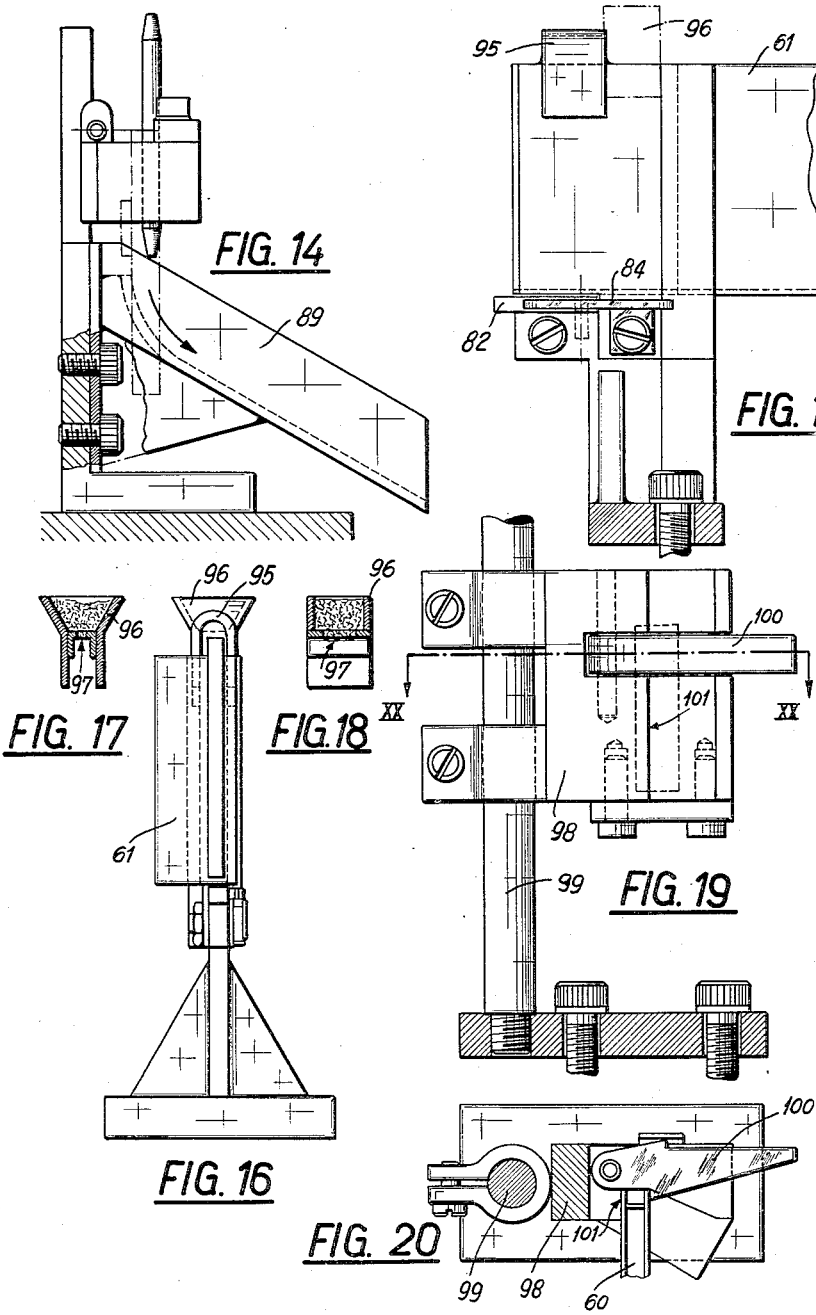

March 18, 1958

G. LEFEVRE 2,827,038

BORING MACHINE ADAPTED MORE PARTICULARLY FOR THE USE IN THE
BORING OF SMALL HARD STONES SERVING FOR INDUSTRIAL PURPOSES
SUCH AS CLOCKWORK JEWELS OR DRAW-PLATES

Filed Nov. 1, 1956

Inventor:
Gabriel Lefevre
by J. Delattre-Seguy
Attorney

United States Patent Office 2,827,038
Patented Mar. 18, 1958

2,827,038

BORING MACHINE ADAPTED MORE PARTICULARLY FOR THE USE IN THE BORING OF SMALL HARD STONES SERVING FOR INDUSTRIAL PURPOSES SUCH AS CLOCKWORK JEWELS OR DRAW-PLATES

Gabriel Lefevre, Paris, France, assignor of one-half to Mo. Na. Cor., Monaco, a French body corporate Application November 1, 1956, Serial No. 619,836

Claims priority, application France November 2, 1955

10 Claims. (Cl. 125—30)

My invention has for its object a boring machine adapted more particularly for use in the boring of small hard stones serving for industrial purposes, such as clockwork jewels or draw-plates.

I have illustrated by way of example in the accompanying drawings a preferred embodiment of a machine according to my invention and intended for such a boring in the case of clockwork stones.

In said drawings:

Figs. 1 and 2 are a general elevational view and a general plan view respectively of said machine.

Fig. 3 shows a battery of five machines of this type.

Fig. 4 is an axial cross-section thereof through line IV—IV of Fig. 2.

Figs. 5 to 25 illustrate details of said machine.

Fig. 27 is a vector diagram of the manner of movement of the clamp of Figs. 6 and 13.

Figure 22:
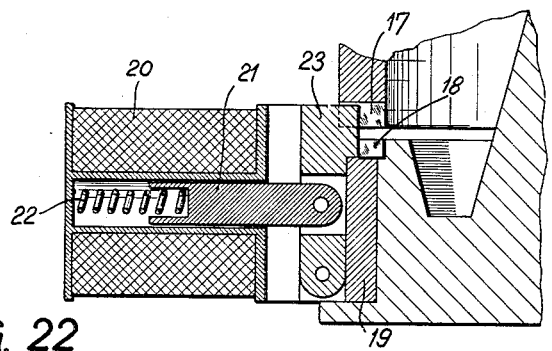

The embodiment illustrated includes as shown in Figs. 1 and 4 a frame constituted by a supporting plate 1, a central stationary shaft 2 (Fig. 4) driven with a force fit into the supporting plate and a sleeve 3 surrounding said shaft and secured to the supporting plate through screws 4. Round the shaft 2 may revolve with the interposition of roller bearings a turret 5 constituted by a vertical sleeve 5a, two superposed spaced plates 5b, an outer sleeve 5c and a cover 5d covering the upper plate 5b. The turret 5 carries inside the outer sleeve 5c and at regular intervals thirty vertical spindles 6. Each of the latter carries at its upper end a blade wheel 7 and at its lower end a drill 8 and it revolves inside cushions held inside bearings 9 rigid with the outer sleeve 5c. Underneath the spindles and as shown in Figures 1 and 4, is provided an annular projection 10 carrying in register with each spindle a sleeve 11 provided with an axial opening; the latter serves as a guiding member for a short bracket 26 to the upper end of which is glued the stone to be bored and which is held in its operative work-perforating position by means of a rocker member 12 extending underneath each spindle 6 (Fig. 1). Underneath each rocker member is cut inside the sleeve 5c an annular series of teeth 27 connected through a friction gear 28 with the electric motor 29 and underneath said annular series of teeth are provided two superposed rings secured to the outer sleeve 5c. Of these rings, the lower ring 13 is entirely made of conductive material while the upper ring 14 includes a plurality of conductive contact-pieces registering each with one of the spindles, said contact pieces being separated by insulating sections. The two rings 13 and 14 are insulated electrically with reference to the frame of the machine, which latter serves for grounding the electric circuit, the insulation being provided by insulating washers and sleeves, as shown at 13a and 13b. On the support 1 are arranged in annular formation thirty insulating carriers 16 the angular distances between which are equal to the arc of a circle separating two successive spindles 6. Twenty-nine of said carriers 16 are identical with each other and carry an upstanding conductive shoe 16a adapted to connect in succession the different contact-pieces on the ring 14 with the ring 13. The thirtieth carrier 31 is provided with two insulated contact-pieces 32 and 33 of which one 32 is adapted to connect the contact-pieces on the ring 14 with the lead 34 while the second contact-piece 33 is adapted to connect the ring 13 with the other lead 35; said last carrier 31 faces the loading means 30 providing for the automatic loading and unloading of the spindles as will be described with further detail hereinafter.

Figure 21:
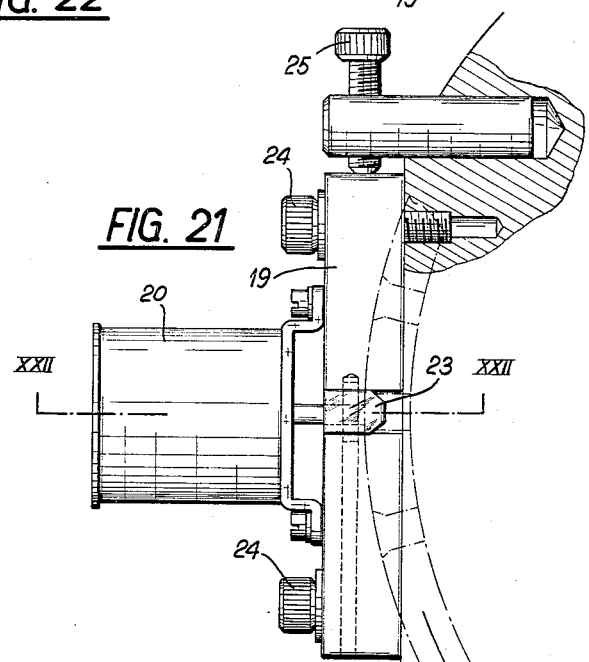

Lastly, the outer sleeve 5c is provided along its lower edge with a series of notches 17 corresponding each to a spindle 6 and which are adapted to register in succession with a single notch 18 shown in Figs. 21 and 22 as formed in the support 1. In register with this last-mentioned notch 18 there is provided on a stationary base 19 an electromagnet 20 the movable core 21 of which, urged by the spring 22, is pivotally connected with a bolt 23. The latter engages when the electromagnet is not energized the notch 18 and simultaneously also that notch 17 which faces the notch 18 at such a moment. The base 19 is fitted on the support 1 through the agency of two screws 24 and before the latter are screwed home said base may be slightly shifted under the action of the screw 25 so as to enter the desired accurate position.

Figures 23, 24, 25:
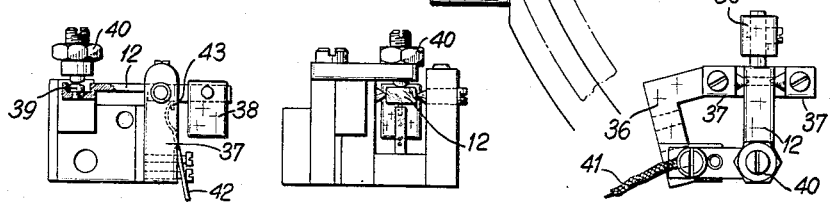

As already mentioned, there is located under each of the spindles and associated projection 10 a rocker member 12. The latter, illustrated in detail in Figs. 23, 24 and 25 and which is also shown in Figs. 1 and 7, is electrically grounded and is carried by a support 36 secured to the rotary sleeve 5c. To said support 36 is secured a strap 37 between the arms of which is pivotally mounted the rocker member 12; the latter carries at one of its ends a counter-weight 38 and at the other end a contact-piece 39 adapted to engage the insulated contact-piece 40 which is connected through the lead 41 with the corresponding contact-piece on the ring 14. A damping spring blade 42 is adapted to act on the tail piece 43 of the rocker member when the latter is near its horizontal position.

A pump or compressor which is not illustrated sends a fluid, for instance oil, under a pressure of 100 to 200 kg./sq. cm. into the chamber 44 provided underneath the cover 5d of the turret through the agency of the axial channel 45. From this chamber, pipes 46 send the driving fluid onto the periphery of the corresponding blade wheels 7 so as to produce a speedy rotation of each of the spindles 6 at a rate of say 30,000 to 100,000 R. P. M. At the same time, said compressor sends through the pipe 47 this same fluid under a pressure of 3 to 4 kg./sq. cm. into the chamber 48 out of which it passes through the pipes 49 inside each of the bearings 9; the fluid as also that which has served for actuating the wheels 7 is exhausted through the pipe 50; a baffle plate 51 prevents it from reaching the drill 8. Above each blade wheel 13 is provided a baffle plate 52 as shown in Figs. 4 and 4a, which plate may be rocked round the axis of the corresponding spindle 6 through the agency of the handle 53 so as to set it between the wheel 7 and the adjacent pipe 46; this stops consequently when required the rotation of the spindle without preventing the other spindles from rotating. It is possible to modify the speed of the spindle by modifying the pressure of the fluid entering the channel 45, for instance through the agency of a valve.

Figure 26:
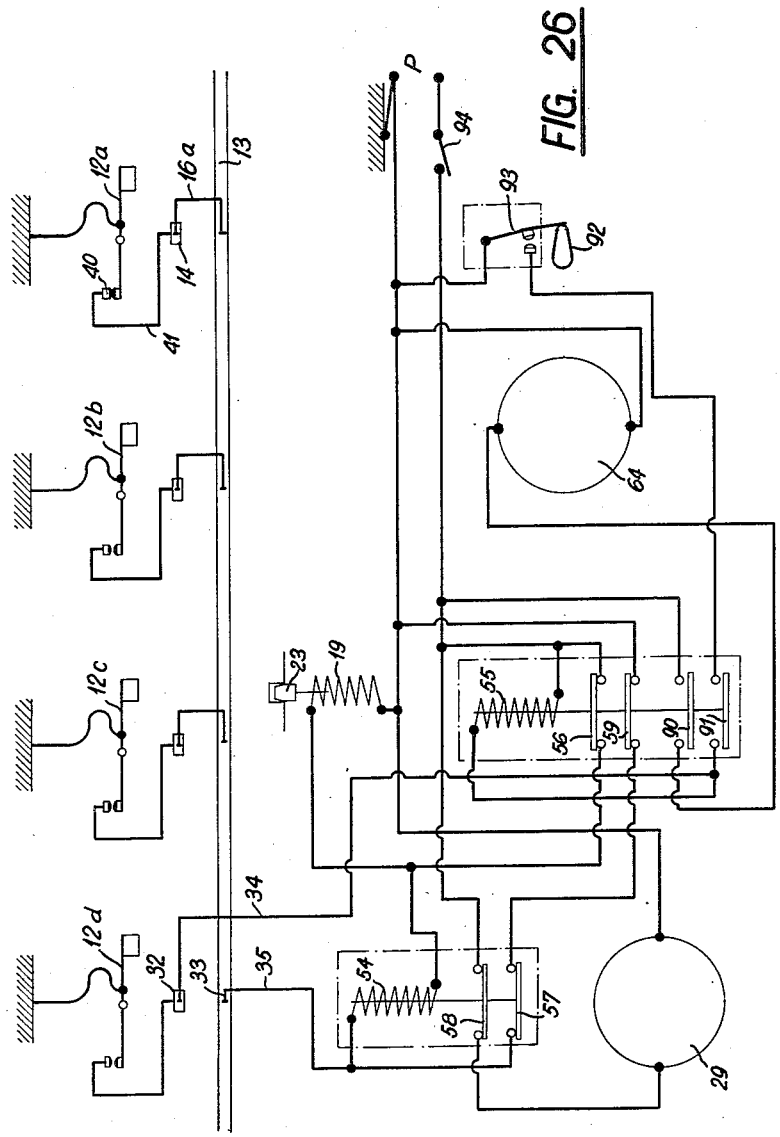
Fig. 26 is an electric wiring diagram.

Fig. 26 is the wiring diagram of the electrical connections which provide for the operation on the one hand of the turret and of the spindles thereon and on the other hand of the loading means. I will temporarily leave aside the structure and the operation of said loading device which will be fully described hereinafter.

It will first be assumed that all the spindles have been loaded and that the compressor has been started and is feeding fluid under pressure both onto the wheels 7 and into the bearings 9. Underneath each spindle is located the stone-carrying bracket 26 urged against the drill on the spindle by the corresponding rocker member 12. The latter which first assumes a sloping position with its counterweight in its uppermost position exerts under the action of the latter an upwardly directed pressure on the bracket wherethrough the stone to be drilled is urged against the drill. When the rocker member 12a corresponding to the spindle 6a on which the machining has progressed to the greatest extent comes near its horizontal position, the spring 42 acts on the tail-piece 43 of said rocker member so as to reduce slightly the pressure exerted by the counterweight and then when the drill has completely perforated the stone, the rocker member 12a which is electrically grounded is brought suddenly into its horizontal position, which causes the two contact pieces 39 and 40 to engage. An impulse is then sent into the ring 13 through the path including the lead 41, the corresponding conductive contact-piece of the ring 14 and the shoe 16a; from this ring 13, said impulse passes through the contact-piece 33 and the wire 35 into the relay 54 which, through the agency of the closed switch 56 of the inoperative relay 55, is connected with the positive terminal of the current supply p the negative terminal of which is grounded. This energizes the electromagnet 19 and draws the bolt 23 out of engagement with the notches 17—18. The relay 54 thus energized closes the switches 57 and 58 of which the former closes a circuit adapted to maintain the self-energization of the relay 54 while the second switch 58 closes the circuit of the electric motor 29. The latter causes then the turret 5 to revolve until the rocker member 12a has come into register with the loading device 30 and with the carrier 31. At this moment, the rocking member 12a which remains grounded closes the circuit over 40—41, the ring 14, the contact-piece 32, the lead 34 and the relay 55. The latter opens the switch 59 so as to break in its turn the circuit of the self-energizing switch 57 and consequently releases the switch 58. The motor 29 is no longer energized and the turret stops. The relay 55 opens also the switch 56 and the electromagnet 19 now deenergized releases through its core the bolt 23 which engages the notches 17 and 18 so as to hold the turret fast during the time required for the automatic unloading and reloading of the spindle 6 which has stopped in front of the loading device 30.

Said loading device is illustrated in Figs. 2, 6, 7, 8 and 10, Fig. 2 showing the arrangement as a whole, Fig. 7 being a plan view with a section of the turret 5 while Figs. 6, 8 and 10 are front, rear and side elevational views of the turret. The loading device includes a channel extending in a horizontal plane and constituted by two sections of which the section 60 is arcuate and is removably fitted on the machine while the other section 61 is rectilinear and is rigidly secured to the machine (Fig. 7). In said channel are inserted about one hundred blocks or brackets at the upper end of each of which is glued or otherwise secured a stone which is to be perforated; these blocks are engaged in vertical succession inside the channel and are urged upwardly in the direction of the arrow f shown in Fig. 7 through a vertical pin 62 shown in Fig. 8, in which figure it is assumed the channel has been removed, said vertical pin 62 being carried by a rotary arm 63 subjected to the action of the coil spring 63a.

64 designates an electric motor to the horizontal shaft of which are keyed two cams 65 and 66 the developed outline of which cams is shown in Figs. 6 and 9. The cam 65 acts through the agency of a lever 67 (Figs. 5 and 7) on a carriage 68 guided horizontally over the frame through four small wheels 68a and through four frusto-conical rollers 69 cooperating with slideways 70 on said frame. Over said carriage may move a block-clamping member forming the chief component of the loading device and including two jaws of which one includes a plate 71 which may slide vertically with reference to the carriage 68 through the agency of four rollers 72 and four small wheels 73. The movements of said plate are controlled by the cam 66 through the agency of the lever 66a (see Fig. 8). The plate 71 is provided on its surface facing the turret with two horizontal noses 74 separated by a gap 75. Inside the latter is revolubly fitted the cooperating jaw 76 of the clamp (see in particular Figs. 6 and 13), which jaw is subjected to the action of a spring blade 77 secured through one end to the plate 71 while its other end acts on the cylindrical stop 76a rigid with the movable jaw 76 so as to urge said stop in the direction of the arrow f1, which brings the jaw 76 into its closed position. On said jaw is also pivotally secured a rocking member 79 held permanently by a small coil spring 78 in a direction transverse with reference to the jaw 76, said rocking member 79 engaging the guiding wall 85 through a notch 85a. The plate 71 forming the first jaw of the clamp is provided on its large rear vertical surface with a slider 80 adapted to move horizontally over it and connected with the jaw 76 through the spring 80a (Figs. 6, 7, 8 and 10).

Assuming as precedingly that the spindle 6a is in position in front of the loading device 30 while the turret is held fast in position through the electromagnet 19, I will now disclose how the unloading is performed, i. e. how the block or bracket carrying the perforated stone is removed from underneath said spindle and then how the loading operation is performed, i. e. how the block is replaced by another block carrying a stone to be perforated. The simplest manner of proceeding consists in explaining first how the loading is executed. I will therefore assume that the block which has already served for the perforation of a stone has been removed and that a fresh block is to replace it; the clamp under the action of the cams 65 and 66 acts then in accordance with the diagram of Fig. 27, i. e. starting from its inoperative position A it moves horizontally towards the turret (travelling section a) and then it rises in parallelism with said turret (travelling section b) and lastly it moves horizontally away from the turret (travelling section c) so as to reach the point B. Fig. 7 illustrates on the right hand side the clamp in its inoperative position A before the beginning of its first forward travelling section a. Its noses 74 are then in register with the output end of the loading channel and a block carrying a perforated stone has already engaged the gap between said noses; it is prevented from dropping by the rotary flap 82 as shown in Fig. 15, said flap 82, located underneath the block, being pivotally secured at 83 and subjected to the action of the return spring 84. Turning to Fig. 13, the jaw 76 is shown as held in its open position while the spring 77 urges it to rock into its closed position, but since the rocking member 79 is held in its transverse position by the spring 78 and by the recess 85a in the plate 85 engaged by its tip, said rocking movement cannot be executed. Now as soon as the clamp moves towards the left hand side, the rocking member 79 moves towards a longitudinal position as shown in dot-and-dash lines at g and the spring 77 shifts the jaw 76 into its closed position for which the block carrying a stone is held fast between the two noses 74 as shown in solid lines on the left hand side of Fig. 13. This horizontal leftward movement of the clamp brings said block into register with the axis of the sleeve 11 which is to carry the latter. The rocking member 12a is held in an approximately vertical position as shown in Fig. 10 by the slider 80 which is stationary during this stage of operation and its spring 80a, the tensioning of which decreases as the clamp progresses, urges said slider against the guide 87 as shown in Fig. 7. This being done, the clamp begins rising along its travelling section b and moves over the guiding plate 85, the rocking member 79 engaging the vertical groove 86 formed in said plate (Fig. 12). The rocking member 79 slides first over the sloping plane 86b and then engages the broader and deeper medial recess 86a. It may then return into its transverse position illustrated in dot-and-dash lines at h on the left hand side of Fig. 13, but without any modification in the position of its pivotal axis so that the jaw 76 remains closed. In contradistinction, as the rising movement of the clamp continues, the rocking member 79 engages the sloping surface 86c (Fig. 12) so that its rocking axis is shifted away from the guiding plate 85 and the clamp opens. The stone-carrying block engages the sleeve 11 and the rocking member 12a which has followed the slider 80 during its upwardly directed movement bears against the lower end of said block so as to hold it in position. From this moment onwards, the clamp may move over its horizontal travelling section c away from the turret. It carries along with it the slider 80 which passes then over the guide 87 the height of which is selected for this purpose. On the other hand the boss 76b on the jaw 76 engages the horizontal guide 89 so that the jaw 76 is held in its open position against the spring 77; at the beginning of the travelling section b of the plate 71, the lower part of the latter closes the outer end of the channel 61 by shifting the flap 82 away (Fig. 7).

For the unloading operation, the clamp executes in the opposite direction the travelling sections followed by it for the loading of the blocks; said clamp is shifted first horizontally along the travelling section c until its noses 74 register with the stone-carrying block to be removed; the slider 80 follows it during said displacement and has returned into its position to the front of the guide 87 and above the rocking member 12a which forms a support for the block when the clamp begins sinking along the travelling section b; the rocking member 79 engaging then the sloping plane 86c, the spring 77 closes the jaw; at the same time, the slider 80 also sinks and causes the rocking member 12a to collapse. When the rocking member 79 has reached the sloping plane 86b, the jaw opens so as to release the block which drops into the discharge channel 89 (Fig. 14) and it remains open until it has executed its horizontal travelling section a and has returned into its starting position A. The slider 80 sinks also with the clamp but it does not move completely through the travelling section a and remains stationary under the action of the guide 87; the spring 81 is merely stretched and the slider continues holding the rocking member 12a in its vertical position with a view to furthering the subsequent loading of a fresh block.

Turning back now to the wiring diagram of Fig. 26, it is apparent that the relay 55 which has opened the switches 56 and 59 has also closed the switches 90 and 91. The switch 90 closes the energizing circuit of the motor 64 of the loading device 30 while the switch 91 closes the self-energizing circuit of the relay 55, this being possible through the fact that, as soon as the unloading or discharging operation has begun, the rocking member 12a has collapsed under the action of the slider 80 and the switch 40 is therefore opened. When the shaft carrying the two cams 65 and 66 has executed one revolution and the unloading and reloading cycle is at an end while the plate 71 occupies its position B illustrated diagrammatically in Fig. 27, a tail-piece 92 carried at the end of the plate 71 opens the switch 93 so as to break the circuit energizing the unloading and reloading motor 64 and also the self-energizing circuit of the relay 55. All the parts of the electric system have thus returned into their starting position.

Figs. 16, 17 and 18 show certain further details. The channel 61 has a U-shaped cross-section and in order to prevent the vertical flanges of said U from moving apart, they carry a strap 95 at their upper ends and behind said strap 95 is positioned another strap 96 carrying a small container filled with a pasty liquid incorporating an abrading powder; the stones carried by the blocks and moving inside the channel engage frictionally the lower output end 97 of said container and carry along with them a small amount of abrasive material. Lastly, Figs. 19 and 20 illustrate the input of the section 61 of the channel. Said section is held in position by a carrier 98 adapted to slide over a vertical upright 99; the end of said channel section engages a bearing surface 101 on said support 98 (Fig. 19) and is held in position with reference thereto by a pivoting bolt.

The machine operates thus automatically and a single person may control a whole group of machines, for instance five machines (see Fig. 3) which are arranged in arcuate formation round said person. The latter has only to change the drills when they are worn out. To this end, he has merely to stop the corresponding spindle through the screen 52 controlled by the handle 53. If the turret is rotating at this very moment, he should first stop it transiently through operation of the hand-actuable switch 94.

My invention should not be considered as limited to the embodiments illustrated and in particular the machine does not include necessarily an automatic loading device. In such a case, the spindle which has just finished its perforating work is brought automatically in front of the location where the person entrusted with the reloading work is standing and it remains stationary in such a position as long as required; the operator stops then the rotation of the spindle through operation of the handle 53 as disclosed and he then removes the perforated stone and substitutes for it a fresh stone to be perforated.

What I claim is:

1. A perforating machine, chiefly for perforating small hard stones for industrial purposes, comprising a stand, a turret revolubly mounted thereon, a motor controlling the rotation of said turret, a circuit system feeding said motor, a series of spindles carried by the successive areas of the turret distributed annularly on said turret round the axis of the latter, said spindles extending in parallelism with said axis, means controlling said spindles, a stone-carrying block adapted to be set in alignment with each spindle and registering with the lower end of the latter, a rocking member pivotally carried by the turret in a vertical plane passing through each spindle and one end of which is adapted to urge the corresponding block into a position for which the stone engages the corresponding spindle, means urging the rocking member into a collapsed position as soon as the stone on the corresponding block has been completely perforated, switching means controlled by the different rocking members in the circuit system to energize the motor upon collapsing of the corresponding rocking member and means wherethrough each rocking member when collapsed and brought by the motor-controlled turret into a predetermined common angular stone discharging position acts on the circuit system to deenergize the motor.

2. In a machine as claimed in claim 1, the provision of a stone-changing device located in front of the turret area carrying the spindle cooperating with the collapsed rocking member entering the stone-discharging position, said device including a horizontally reciprocating member movable radially of the turret, a clamp carried by the latter and adapted to engage and disengage a stone-carrying block when said reciprocating member is in its inner position and means controlling the reciprocation of the reciprocating member and the operation of the clamp.

3. In a machine as claimed in claim 1, the combination of a carriage horizontally reciprocating into and out of register with the turret areas brought into the angular stone-discharging position provided for the corresponding rocking members, a feeding channel for a succession of blocks, carrying unperforated stones, a camshaft, a first cam on said camshaft controlling the reciprocation of said carriage, a clamp including an arm vertically movable over said carriage and an arm pivotally secured to said first arm, a spring urging the two arms towards each other for engaging a stone-carrying block in the feeding channel, an auxiliary rocking member cooperating with the clamp arms, a stationary guiding surface adapted to act on said auxiliary rocking member when the carriage is in its outermost position and the clamp in its uppermost position to make said rocking member space the arms of the clamp, a slider adapted to slide horizontally over the carriage and adapted to control the angular setting of the rocking member corresponding to the block to be changed, elastic means operatively connecting the slider with the clamp and means controlling the camshaft to produce the movements of the reciprocating member and of the clamp to provide in succession, for the uppermost outermost position of the carriage-carried clamp, the engagement of the block facing the latter and carrying the perforated stone between the spaced arms of the clamp, a closing of said arms upon sinking of the clamp, and a reopening thereof to exhaust said block into the chute, an engagement of the spaced clamp arms with a stone-carrying block in the feeding channel upon an outward movement of the carriage, a closing of the clamp over the block upon an inward returning movement of the carriage, an opening thereof upon rising of the clamp to insert the block in position over its rocking member in register with the rocking spindle and a return of the clamp into its uppermost outermost position.

4. A perforating machine, chiefly for perforating small hard stones for industrial purposes, comprising a stand, a turret revolubly mounted thereon, a motor controlling the rotation of said turret, a circuit system feeding said motor, a series of spindles carried by the successive areas of the turret distributed annularly on said turret round the axis of the latter, said spindles extending in parallelism with said axis, means controlling said spindles, a stone-carrying block adapted to be set in alignment with each spindle and registering with the lower end of the latter, a rocking member pivotally carried by the turret in a vertical plane passing through each spindle and one end of which is adapted to urge the corresponding block into a position for which the stone engages the corresponding spindle, means urging the rocking member into a collapsed position as soon as the stone on the corresponding block has been completely perforated, switching means controlled by the different rocking members in the circuit system to energize the motor upon collapsing of the corresponding rocking member, means wherethrough each rocking member when collapsed and brought by the motor-controlled turret into a predetermined common angular stone-discharging position acts on the circuit system to deenergize the motor, and means adapted to lock the turret in the angular position assumed by it upon the rocking member entering said predetermined position and controlled by last mentioned motor deenergizing means.

5. A perforating machine, chiefly for perforating small hard stones for industrial purposes, comprising a stand, a turret revolubly mounted thereon, a motor controlling the rotation of said turret, a circuit system feeding said motor, a series of spindles carried by the successive areas of the turret distributed annularly on said turret round the axis of the latter, said spindles extending in parallelism with said axis, means controlling said spindles, a stone-carrying block adapted to be set in alignment with each spindle and registering with the lower end of the latter, a rocking member pivotally carried by the turret in a vertical plane passing through each spindle and one end of which is adapted to urge the corresponding block into a position for which the stone engages the corresponding spindle, means urging the rocking member into a collapsed position as soon as the stone on the corresponding block has been completely perforated, elastic means braking the movement of each rocking member towards its collapsed position, switching means controlled by the different rocking members in the circuit system to energize the motor upon collapsing of the corresponding rocking member, and means wherethrough each rocking member when collapsed and brought by the motor-controlled turret into a predetermined common angular stone-discharging position acts on the circuit system to deenergize the motor.

6. A perforating machine, chiefly for perforating small hard stones for industrial purposes, comprising a stand, a turret revolubly mounted thereon, a motor controlling the rotation of said turret, a circuit system feeding said motor, a series of spindles carried by the successive areas of the turret distributed annularly on said turret round the axis of the latter, said spindles extending in parallelism with said axis, means controlling said spindles, a stone-carrying block adapted to be set in alignment with each spindle and registering with the lower end of the latter, a rocking member pivotally carried by the turret in a vertical plane passing through each spindle and one end of which is adapted to urge the corresponding block into a position for which the stone engages the corresponding spindle, means urging the rocking member into a collapsed position as soon as the stone on the corresponding block has been completely perforated, elastic means braking the movement of each rocking member towards its collapsed position, switching means controlled by the different rocking members in the circuit system to energize the motor upon collapsing of the corresponding rocking member, means wherethrough each rocking member when collapsed and brought by the motor-controlled turret into a predetermined common angular stone-discharging position acts on the circuit system to deenergize the motor, means for discharging the stone-carrying block upon deenergizing of the motor, means for setting a block carrying an unperforated stone in position on the corresponding block, and means for feeding an abrasive substance over the unperforated stones to be perforated, before the latter are set on the corresponding blocks.

7. A perforating machine, chiefly for perforating small hard stones for industrial purposes, comprising a stand, a turret revolubly mounted thereon, a motor controlling the rotation of said turret, a circuit system feeding said motor, a series of spindles carried by the successive areas of the turret distributed annularly on said turret round the axis of the latter, said spindles extending in parallelism with said axis, a hydraulic system controlling the rotation of the spindle, a valve controlling and adjusting the flow of liquid through the hydraulic system and thereby the speed of rotation of the spindle, a stone, carrying block adapted to be set in alignment with each spindle and registering with the lower end of the latter, a rocking member pivotally carried by the turret in a vertical plane passing through each spindle and one end of which is adapted to urge the corresponding block into a position for which the stone engages the corresponding spindle, means urging the rocking member into a collapsed position as soon as the stone on the corresponding block has been completely perforated, switching means controlled by the different rocking members in the circuit system to energize the motor upon collapsing of the corresponding rocking member and means wherethrough each rocking member when collapsed and brought by the motor-controlled turret into a predetermined common angular stone-discharging position acts on the circuit system to deenergize the motor.

8. A perforating machine, chiefly for perforating small hard stones for industrial purposes, comprising a stand, a turret revolubly mounted thereon, a motor controlling the rotation of said turret, a circuit system feeding said motor, a series of spindles carried by the successive areas of the turret distributed annularly on said turret round the axis of the latter, said spindles extending in parallelism with said axis, a hydraulic system controlling the rotation of the spindle and simultaneously lubricating the rotary parts, a valve controlling and adjusting the flow of liquid through the hydraulic system and thereby the speed of rotation of the spindle, a stone-carrying block adapted to be set in alignment with each spindle and registering with the lower end of the latter, a rocking member pivotally carried by the turret in a vertical plane passing through each spindle and one end of which is adapted to urge the corresponding block into a position for which the stone engages the corresponding spindle, means urging the rocking member into a collapsed position as soon as the stone on the corresponding block has been completely perforated, switching means controlled by the different rocking members in the circuit system to energize the motor upon collapsing of the corresponding rocking member and means wherethrough each rocking member when collapsed and brought by the motor-controlled turret into a predetermined common angular stone-discharging position acts on the circuit system to deenergize the motor.

9. A perforating machine, chiefly for perforating small hard stones for industrial purposes, comprising a stand, a turret revolubly mounted thereon, a motor controlling the rotation of said turret, a circuit system feeding said motor, a series of spindles carried by the successive areas of the turret distributed annularly on said turret round the axis of the latter, said spindles extending in parallelism with said axis, a hydraulic circuit, a nozzle fed by said circuit in register with each spindle, a blade wheel coaxially rigid with each spindle and subjected to the action of the fluid passing out of the corresponding nozzle to make the latter rotate, means for adjusting the flow of the liquid inside the circuit, a stone-carrying block adapted to be set in alignment with each spindle and registering with the lower end of the latter, a rocking member pivotally carried by the turret in a vertical plane passing through each spindle and one end of which is adapted to urge the corresponding block into a position for which the stone engages the corresponding spindle, means urging the rocking member into a collapsed position as soon as the stone on the corresponding block has been completely perforated, switching means controlled by the different rocking members in the circuit system to energize the motor upon collapsing of the corresponding rocking member and means wherethrough each rocking member when collapsed and brought by the motor-controlled turret into a predetermined common angular stone-discharging position acts on the circuit system to deenergize the motor.

10. A perforating machine, chiefly for perforating small hard stones for industrial purposes, comprising a stand, a turret revolubly mounted thereon, a motor controlling the rotation of said turret, a circuit system feeding said motor, a series of spindles carried by the successive areas of the turret distributed annularly on said turret round the axis of the latter, said spindles extending in parallelism with said axis, a hydraulic circuit, a nozzle fed by said circuit in register with each spindle, a blade wheel coaxially rigid with each spindle and subjected to the action of the fluid passing out of the corresponding nozzle to make the latter rotate, a reflector adjustably positioned between each nozzle and the corresponding spindle and adapted upon actuation to adjust accordingly the speed of the spindle between zero and a maximum, a stone-carrying block adapted to be set in alignment with each spindle and registering with the lower end of the latter, a rocking member pivotally carried by the turret in a vertical plane passing through each spindle and one end of which is adapted to urge the corresponding block into a position for which the stone engages the corresponding spindle, means urging the rocking member into a collapsed position as soon as the stone on the corresponding block has been completely perforated, switching means controlled by the different rocking members in the circuit system to energize the motor upon collapsing of the corresponding rocking member and means wherethrough each rocking member when collapsed and brought by the motor-controlled turret into a predetermined common angular stone-discharging position acts on the circuit system to deenergize the motor.

References Cited in the file of this patent

UNITED STATES PATENTS

| | | |
|---|---|---|
| 2,298,979 | Simons | Oct. 13, 1942 |
| 2,441,004 | Bieberich | May 4, 1948 |
| 2,616,410 | Potter et al. | Nov. 4, 1952 |